United States Patent
Toma et al.

[11] Patent Number: 5,941,504
[45] Date of Patent: Aug. 24, 1999

[54] WATER SAVING SYSTEM

[76] Inventors: Vasile I. Toma; Mihaela Toma, both of 823 Chestnut St., Reading, Pa. 19602

[21] Appl. No.: 09/128,615

[22] Filed: Aug. 3, 1998

[51] Int. Cl.$^6$ .............................. F16K 31/62; F16K 31/06
[52] U.S. Cl. ................................................ 251/295; 4/614
[58] Field of Search .................................... 251/295, 294, 251/57; 4/619, 630

[56] References Cited

U.S. PATENT DOCUMENTS

| | | | |
|---|---|---|---|
| 2,830,618 | 4/1958 | Mitchell | 251/295 |
| 4,295,609 | 10/1981 | Brown, Jr. | 4/619 X |
| 5,095,941 | 3/1992 | Betz | 251/295 X |
| 5,125,623 | 6/1992 | Kiedinger | 251/295 |
| 5,199,119 | 4/1993 | Weber . | |
| 5,203,373 | 4/1993 | Austin, Jr. et al. | 251/295 X |
| 5,307,837 | 5/1994 | Woltz et al. . | |
| 5,322,084 | 6/1994 | Ghiassian | 251/295 X |
| 5,386,600 | 2/1995 | Gilbert, Sr. . | |
| 5,511,763 | 4/1996 | Green . | |
| 5,689,843 | 11/1997 | Duke et al. | 251/295 X |

FOREIGN PATENT DOCUMENTS

| | | | |
|---|---|---|---|
| 1104450 | 12/1956 | Germany | 251/295 |
| 2513092 | 10/1976 | Germany | 251/295 |

*Primary Examiner*—John Rivell
*Assistant Examiner*—Meredith H. Schoenfeld
*Attorney, Agent, or Firm*—Michael I. Kroll

[57] ABSTRACT

A foot actuated flow control valve connected to a power supply for controlling the flow of a liquid substance through a water supply line to a faucet. The foot actuated flow control valve includes a bypass conduit connected to the water supply line; an electric switch connected to control a flow of water through the bypass conduit and a foot pedal connected between the electric switch and the power source. The electric switch includes a first terminal connected to a negative terminal of the power supply and a second terminal. The foot pedal includes a first terminal connected to a positive terminal of the power supply, a second terminal connected to the second terminal of the electric switch and a contact element connected to the first terminal of the foot pedal. When a pressure is applied to the foot pedal the contact element is caused to contact the second terminal of the foot pedal connecting the electric switch to the power supply. The application of a voltage to the electric switch causes the switch to open allowing water to pass through the bypass conduit. A bypass conduit and electric switch may be connected to both a hot and cold water supply lines for supplying either hot water, cold water or warm water through the faucet.

14 Claims, 8 Drawing Sheets he present invention relates generally to water faucets and, more specifically, to an apparatus for conserving water by controlling an amount of water flowing from a faucet in

WATER SAVING SYSTEM

BACKGROUND OF THE INVENTION

1. Field of the Invention

The present invention relates generally to water faucets and, more specifically, to an apparatus for conserving water by controlling an amount of water flowing from a faucet in either a commercial or residential environment through the use of a foot pedal connected to activate electric valves directing the flow of water to the faucet and bypassing a shutoff valve in the main water supply line.

2. Description of the Prior Art

Numerous types of water faucet flow control systems have been provided in the prior art. For example, U.S. Pat. Nos. 5,199,119; 5,307,837; 5,386,600 and 5,511,763 all are illustrative of such prior art. While these units may be suitable for the particular purpose to which they address, they would not be as suitable for the purposes of the present invention as heretofore described.

A remote control wash basin is disclosed having a foot pedal operation. The foot pedal operates a crank to pull a wire cable that operates a lever to open a normally closed push button valve. Depressing the foot pedal latches the valve into the open position where it remains until a release pedal is depressed. The release pedal occupies the portion of the face of the foot pedal and releases the latch to allow the foot pedal to return to its normally non-operational position. The foot pedal operated fluid controlling mechanism can be added to a wash basin cabinet with minimal changes.

Water valve apparatus with distal control includes at least one valve for controlling flow of water therethrough and having a movable actuator for starting and stopping the flow of water. A permanent magnet, disposed proximate said actuator for magnetic engagement therewith, is provided for moving the actuator between a first position stopping water flow through the valve and a second position allowing water flow through the valve. A movable member is provided to alter the magnetic engagement between the permanent magnet and the actuator in order to move the actuator. A cable, having a slideable center wire attached to the movable member and a sheath attached to the valve is connected to a manually operable lever, for operating said cable in a manner causing movement of the movable member and concomitant movement of the actuator, as a result of magnetic engagement alteration, in order to start and stop water flow through the valve.

An assembly with valves that permits fluid flow through the invention when the foot pedal is depressed. A mechanism engaged by depressing toe kick will latch pedal in a position where fluid flow continues after the foot is removed. Depressing pedal while the latch is engaged, causes the latch to automatically disengage. When pedal is released at this time, fluid flow will stop. The assembly is designed to be installed in the cabinet under a kitchen or lavatory sink with all elements concealed except part of pedal and part of the latch mechanism. The assembly is compact by design and is easily installed by cutting a hole for the pedal in the lowest shelf of cabinet, securing it with screws, and routing flexible hoses from the sources of hot and cold water to the invention, and from the invention to the hot and cold water connections of a standard faucet set.

A water saving device, implemented as a pair of spring loaded, normally-open shutoff valves inserted into the hot and clod water supply lines of a faucet, which are connected via a cable mechanism to a foot actuator. Actuating the mechanism causes the shutoff valves to close, interrupting any flow of water in the supply lines. Releasing the mechanism allows flow to resume. The shutoff valves are installed in series upstream of the normal hand-operated faucet valves. The user starts the water flow and adjusts the temperature of the water in the normal manner using the hand-operated faucet valves. When the user wishes to temporarily stop the water flow he or she steps on the foot pedal, thereby causing the shutoff valves to close. When the pedal is released the shutoff valves open and the water flow resumes at the same flow rate and temperature previously set by the user.

SUMMARY OF THE PRESENT INVENTION

The present invention relates generally to water faucets and, more specifically, to an apparatus for conserving water by controlling an amount of water flowing from a faucet in either a commercial or residential environment through the use of a foot pedal connected to activate electric valves directing the flow of water to the faucet and bypassing a shutoff valve in the main water supply line.

A primary object of the present invention is to provide a foot actuated flow control valve for a faucet that will overcome the shortcomings of prior art devices.

Another object of the present invention is to provide a foot actuated flow control valve for a faucet which is able to control operation of the hot and/or cold water supply lines providing water to a faucet.

A further object of the present invention is to provide a foot actuated flow control valve for a faucet which is able to automatically shut off the water supplied to a faucet upon removal of pressure from the foot pedal.

A still further object of the present invention is to provide a foot actuated flow control valve for a faucet including a foot pedal for controlling a flow of water to the faucet which is easily activated by both children and persons with physical handicaps.

A further object of the present invention is to provide a foot actuated flow control valve for a faucet including first and second foot pedals for controlling the supply of hot and cold water respectively.

A further object of the present invention is to provide a foot actuated flow control valve for a faucet able to eliminate the use of hand operated controls for controlling the supply of water exiting the faucet.

Another object of the present invention is to provide a foot actuated flow control valve for a faucet including a manual cutoff valve for disconnecting the bypass conduit and allowing use of the manual faucet controls during a power failure.

A still further object of the present invention is to provide a foot actuated flow control valve for a faucet which is able to save at least 1000 gallons of water per month per user thereby decreasing the water bill of the user and providing the saved water for other uses such as in agriculture.

An even further object of the present invention is to provide a foot actuated flow control valve for a faucet which eliminates the need for permits to store water on public lands.

A yet further object of the present invention is to provide a foot actuated flow control valve for a faucet which will eliminate the need for a plumber to replace the gasket in the faucet.

Another object of the present invention is to provide a foot actuated flow control valve for a faucet that is simple and easy to use.

A still further object of the present invention is to provide a foot actuated flow control valve for a faucet that is economical in cost to manufacture.

Additional objects of the present invention will appear as the description proceeds.

A foot actuated flow control valve connected to a power supply for controlling the flow of a liquid substance through a water supply line to a faucet is disclosed by the present invention. The foot actuated flow control valve includes a bypass conduit connected to the water supply line; an electric switch connected to control a flow of water through the bypass conduit and a foot pedal connected between the electric switch and the power source. The electric switch includes a first terminal connected to a negative terminal of the power supply and a second terminal. The foot pedal includes a first terminal connected to a positive terminal of the power supply, a second terminal connected to the second terminal of the electric switch and a contact element connected to the first terminal of the foot pedal. When a pressure is applied to the foot pedal the contact element is caused to contact the second terminal of the foot pedal connecting the electric switch to the power supply. The application of a voltage to the electric switch causes the switch to open allowing water to pass through the bypass conduit. A bypass conduit and electric switch may be connected to both a hot and cold water supply lines for supplying either hot water, cold water or warm water through the faucet.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 7:
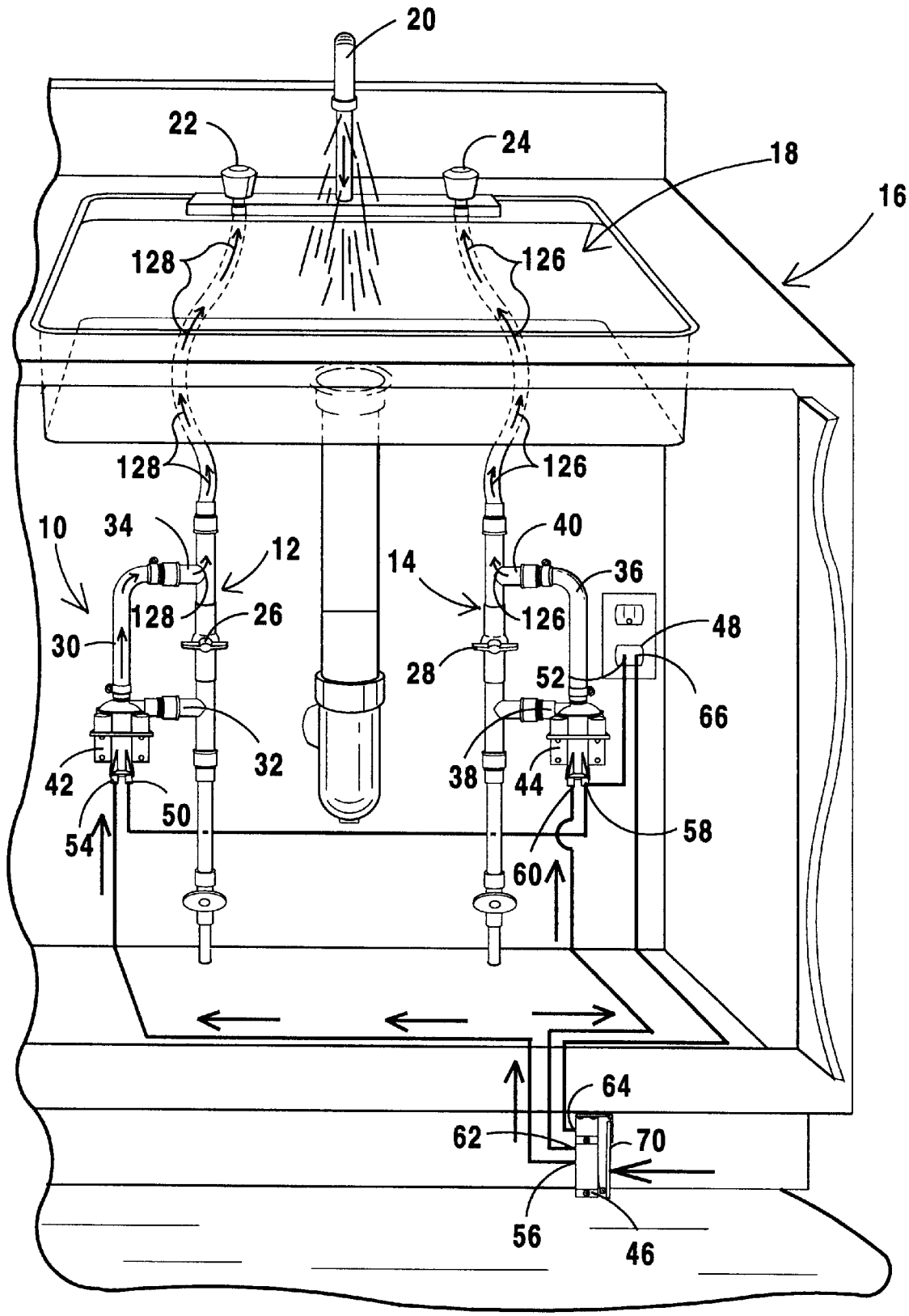
Figure 8:
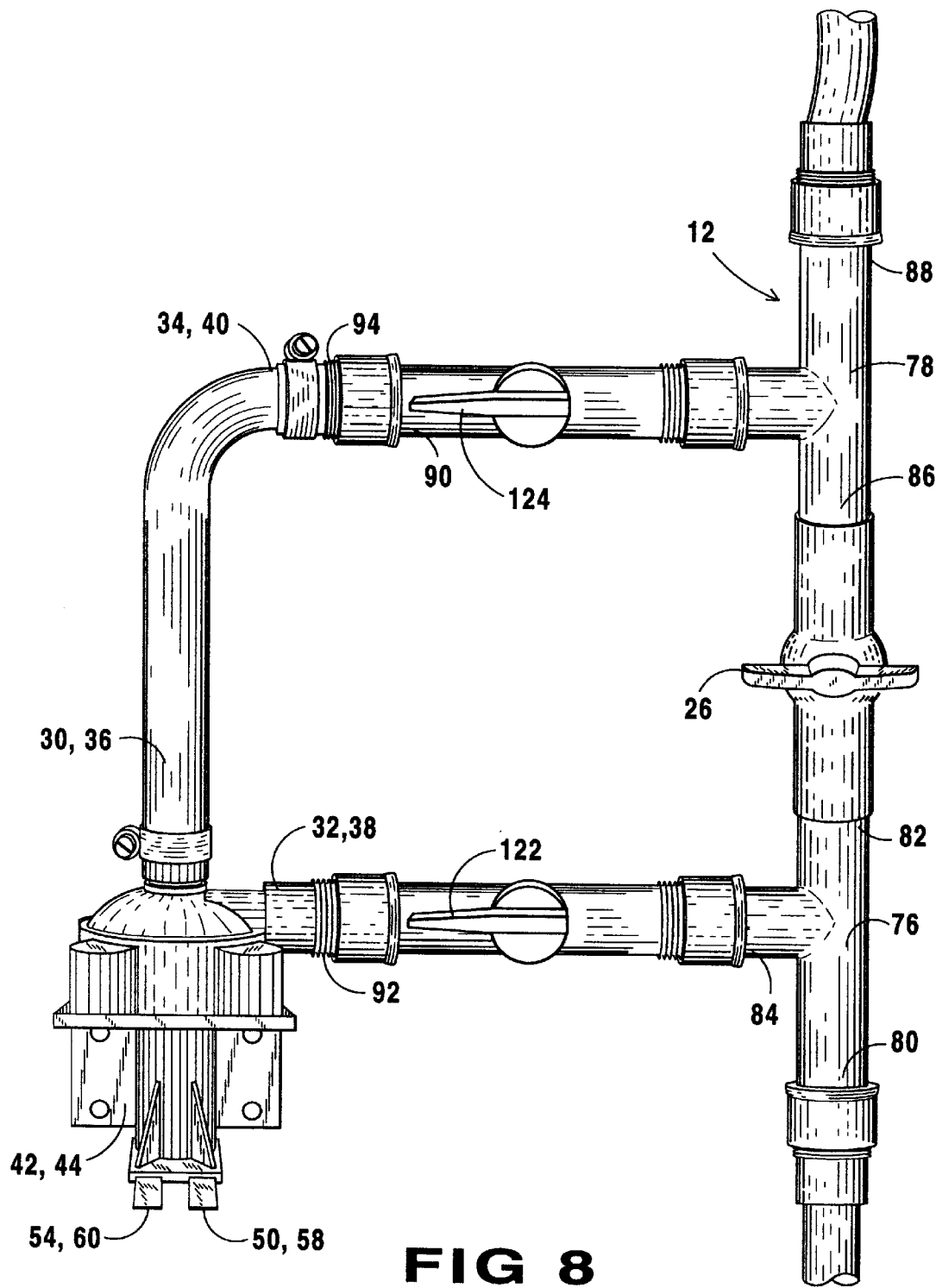

FIG. 7 is a front perspective view of a leg of the foot actuated flow control valve for a faucet of the present invention connected to bypass water flowing through water supply lines with the foot pedal actuated to supply water through both valves; and FIG. 8 is a front perspective view of a second embodiment of the bypass conduit of the foot actuated flow control valve for a faucet of the present invention connected to a water supply line.

DESCRIPTION OF THE REFERENCED NUMERALS

Turning now descriptively to the drawings, in which similar reference characters denote similar elements throughout the several views, the Figures illustrate the foot actuated flow control valve for a faucet of the present invention. With regard to the reference numerals used, the following numbering is used throughout the various drawing figures.

10 foot actuated flow control valve for a faucet of the present invention
12 hot water supply line
14 cold water supply line
16 cabinet
18 sink
20 faucet
22 hot water control knob
24 cold water control knob
26 first shut off valve
28 second shut off valve
30 first bypass conduit
32 input of first bypass conduit
34 output of first bypass conduit
36 second bypass conduit
38 input of second bypass conduit
40 output of second bypass conduit
42 first electrical switch
44 second electrical switch
46 foot pedal
48 electrical outlet
50 first terminal of the first electrical switch
52 ground terminal of the electrical outlet
54 second terminal of the first electrical switch
56 first terminal of the foot pedal
58 first terminal of the second electrical switch
60 second terminal of the second electrical switch
62 second terminal of the foot pedal
64 third terminal of the foot pedal
66 positive terminal of the electrical outlet
68 base section of foot pedal
70 foot activated push button
72 first contact of foot pedal
74 second contact of foot pedal
76 first T-shaped pipe
78 second T-shaped pipe
80 first end of first T-shaped pipe
82 second end of first T-shaped pipe
84 third end of first T-shaped pipe
86 first end of second T-shaped pipe
88 second end of second T-shaped pipe
90 third end of second T-shaped pipe
92 connection between input of first bypass conduit and T-shaped pipe
94 connection between output of first bypass conduit and T-shaped pipe
96 contact of first switch
98 terminal of first switch
100 contact of second switch
102 terminal of second switch
104 first side of base section
106 second side of base section
108 first connecting device for securing first and second switches to second side of base section 110 second connecting device for securing first and second switches to second side of base section
112 first connecting device for securing first side to second side of base section
114 second connecting device for securing first side to second side of base section
116 top side of base section
118 device for securing base section to cabinet
120 hinge
122 first shut off valve on bypass conduit
124 second shutoff valve on bypass conduit
126 arrows indicating flow of cold water through cold water supply line
128 arrows indicating flow of hot water through hot water supply line

DETAILED DESCRIPTION OF THE PREFERRED EMBODIMENT

Turning now descriptively to the drawings, in which similar reference characters denote similar elements throughout the several views, FIGS. 1 through 8 illustrate the foot actuated flow control valve for a faucet of the present invention indicated generally by the numeral 10.

The foot actuated flow control valve for a faucet 10 is connected to both a hot water supply line 12 and a cold water supply line 14. The hot and cold water supply lines 12 and 14 are positioned within a cabinet 16 leading to a sink 18 positioned therein. The sink 18 includes a faucet 20 for providing water therethrough and both a hot water control knob 22 and a cold water control knob 24. A first shut off valve 26 is positioned on the hot water supply line 12 for controlling a flow of water through the hot water supply line 12. A second shut off valve 28 is positioned on the cold water supply line 14 for controlling a flow of water through the cold water supply line 14.

The foot actuated flow control valve 10 includes a first bypass conduit 30 connected to bypass the hot water supply line 12, the first shut off valve 26 being positioned on the hot water supply line 12 between an input 32 and an output 34 of the first bypass conduit 30. A second bypass conduit 36 is connected to bypass the cold water supply line 14, the second shut off valve 28 being positioned on the cold water supply line 14 between an input 38 and an output 40 of the second bypass conduit 36. A first electric switch 42 is connected to control the flow of water through the first bypass conduit 30 and a second electric switch 44 is connected to control the flow of water through the second bypass conduit 36.

A foot pedal 46 is connected between an electrical outlet 48 and both the first and second electric switches 42 and 44. A first terminal 50 of the first electric switch 42 is connected to a negative or ground terminal 52 of the power supply and a second terminal 54 of the first electric switch 42 is connected to a first terminal 56 of the foot pedal 46. A first terminal 58 of the second electric switch 44 is connected to the ground terminal 52 of the power supply 48 and a second terminal 60 of the second electric switch 44 is connected to a second terminal 62 of the foot pedal 46. A third terminal 64 of the foot pedal 46 is connected to the positive terminal 66 of the electric outlet 48. The power supply 48 is illustrated as an electrical outlet however any known power supply such as a battery or solar panels can be used to provide power for the foot actuated flow control valve 10 of the present invention.

Figure 2:
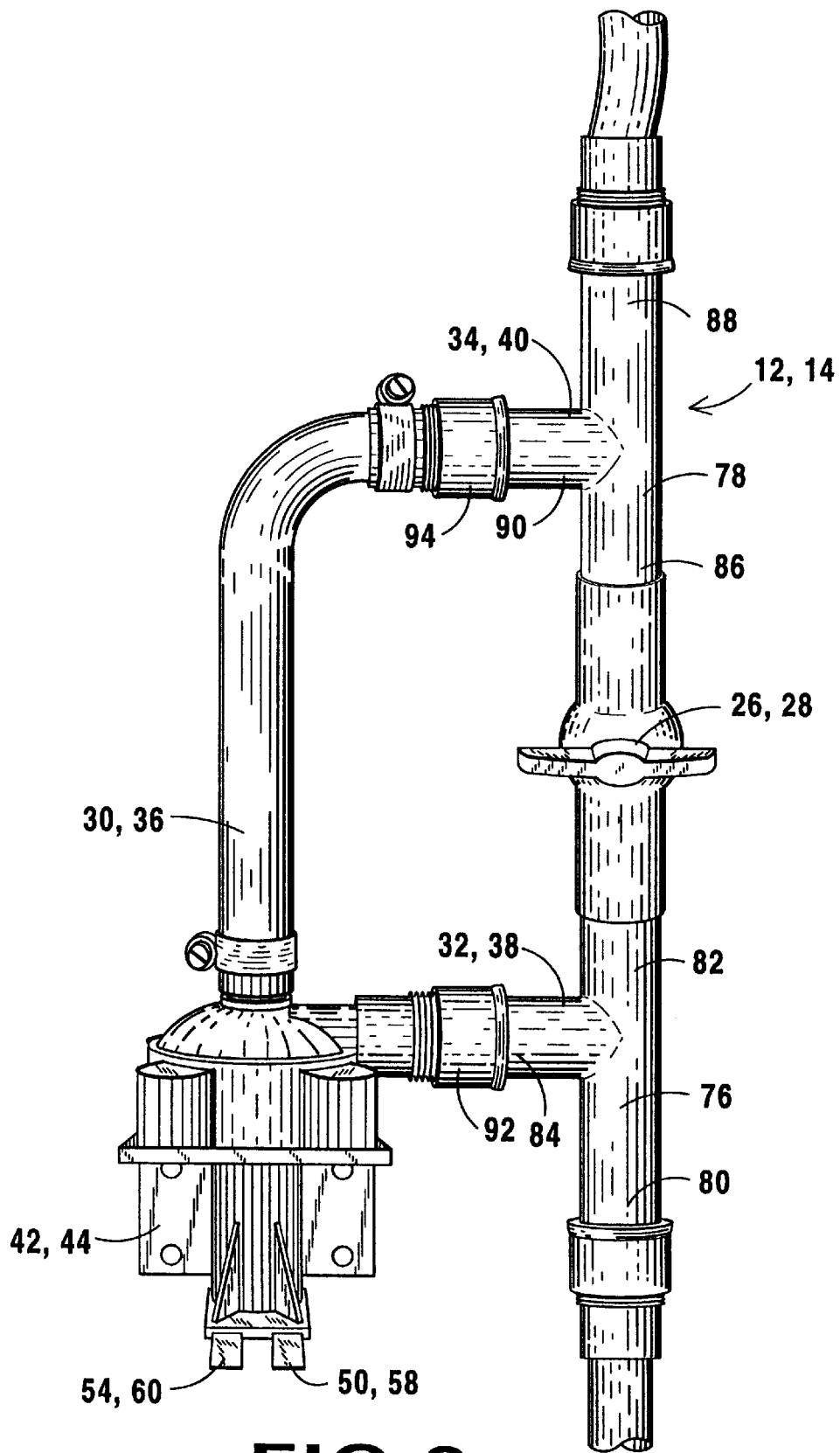
FIG. 2 is an front perspective view of the bypass conduit of the foot actuated flow control valve for a faucet of the present invention connected to the main water supply line.

The connection between the bypass conduit 30, 36 and the water supply lines 12, 14 is illustrated in FIG. 2. As is shown in this figure, the bypass conduit 30, 36 is connected to the water supply line 12, 14 and is positioned to bypass the shut off valves 26, 28. The input 32, 38 of the bypass conduits 30, 36 is connected at a position below the shut off valves 26, 28 and the output 34, 40 is connected on an opposite side of the shut off valves 26, 28. The electric switch 42, 44 is connected along the length of the bypass conduit 30, 36 and acts to control the flow of water therethrough.

The electric switch 42, 44 includes the first terminal 50, 58 for connection to the negative or ground terminal 52 of the electric outlet 48 and the second terminal 54, 60 for connection to the foot pedal 46. The electric switch 42, 44 is in the normally closed position preventing water from flowing through the bypass conduit 30, 36. When the foot pedal 46 is depressed, an electric connection is made between the electric switch 42, 44 and the electric outlet 48 causing the electric switch 42, 44 to open allowing water to flow through the bypass conduit 30, 36. The electric switch 42, 44 will remain in the open position until the pressure is removed from the foot pedal 46 causing the electric connection to be broken or interrupted. When the foot actuated flow control valve 10 is connected to the water supply lines, the shut off valves 26 and 28 should be closed to prevent water from flowing therethrough.

To connect the bypass conduit 30, 36 to the water supply line 12, 14 the pipes on either side of the shut off valve 26, 28 should be replaced by first and second T-shaped pipes 76 and 78 respectively. The first T-shaped pipe 76 will connect at a first end 80 to the water supply line 12, 14 leading to the shut off valve 26,28, a second end 82 of the T-shaped pipe 76 will connect to the water supply line 12, 14 below the shut off valve 26, 28 and a third end of the T-shaped pipe 76 will connect to the input 32, 38 of the bypass conduit 30, 36. The second T-shaped pipe 78 will connect at a first end 86 to the water supply line 12, 14 at a position above the shut off valve 26, 28, a second end 88 of the T-shaped pipe 76 will connect to the water supply line 12, 14 leading to the faucet 20 and a third end 90 of the T-shaped pipe 76 will connect to the output 34, 40 of the bypass conduit 30, 36. The input 32, 38 of the bypass conduit 30, 36 is connected to the first T-shaped pipe 76 at a first connection point 92 and the output 34, 40 of the bypass conduit 30, 36 is connected to the first T-shaped pipe 76 at a second connection point 94. The bypass conduit 30, 36 is connected to the first and second T-shaped pipes 76, 78 by any known conventional means for securing pipes together in a plumbing system.

Figure 3:
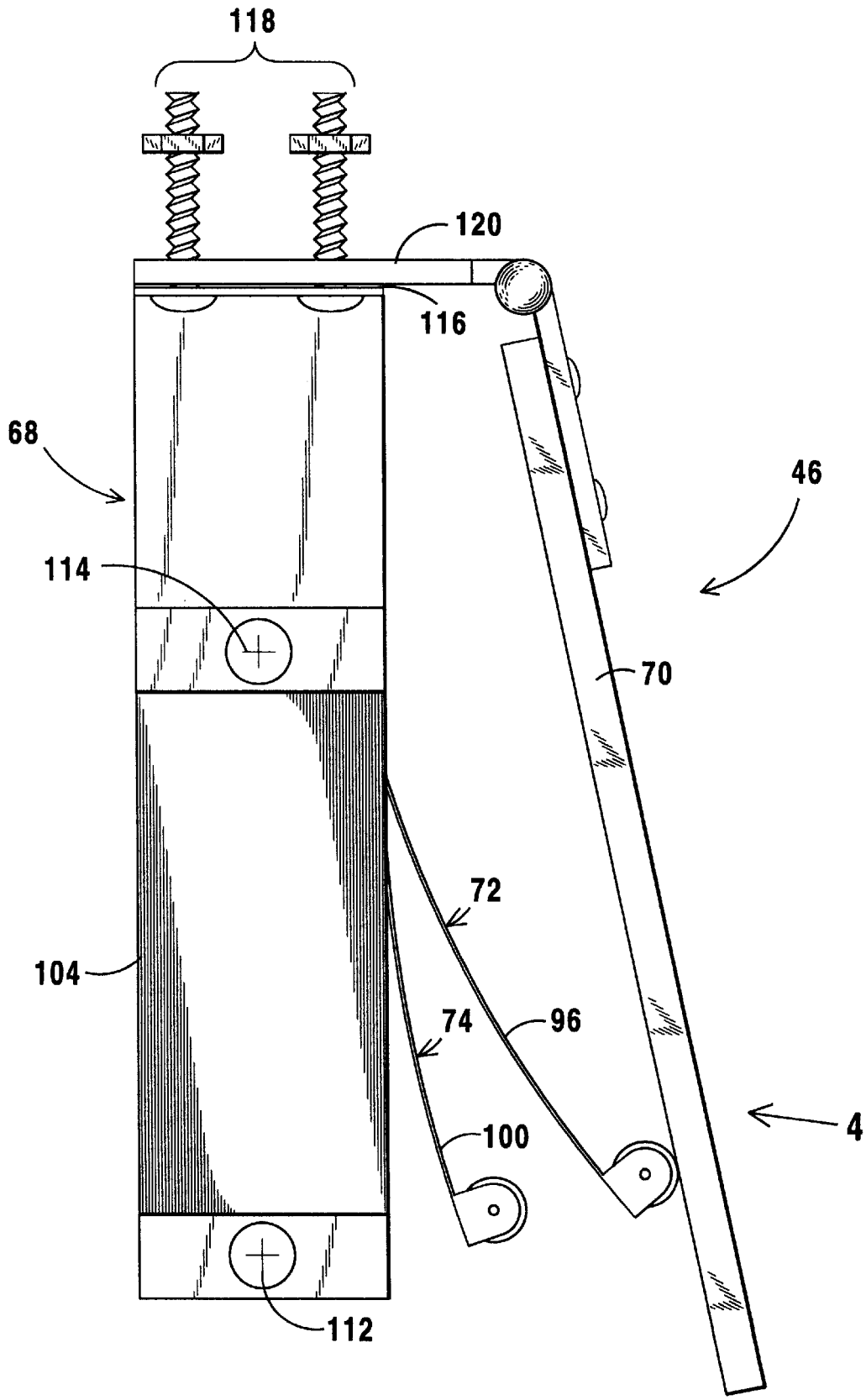
FIG. 3 is an enlarged side perspective view of the foot pedal of the foot actuated flow control valve for a faucet of the present invention.
Figure 4:
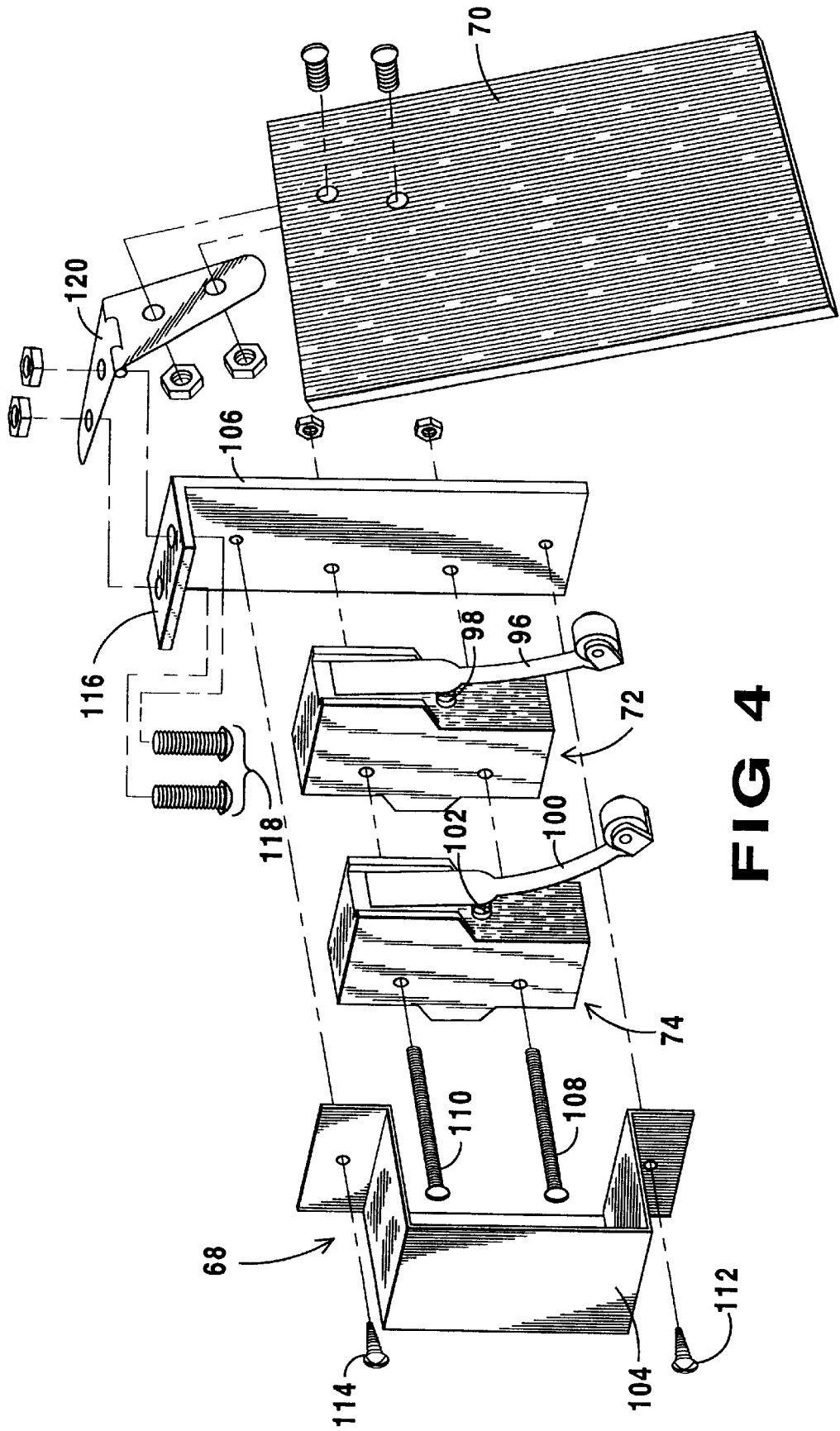
FIG. 4 is a exploded side perspective view of the foot pedal of the foot actuated flow control valve for a faucet of the present invention.

The foot pedal 46 is illustrated in FIGS. 3 and 4. As can be seen from these figures, the foot pedal 46 includes two switches 72 and 74. The foot pedal 46 also includes a base section 68 in which the first and second switches 72 and 74, respectively, are positioned. A foot activated push button 70 extends from the base section 68 for activation of the first and second switches 72 and 74 by the user. A first contact 96 extends from the first switch 72. When the first contact 96 is contacted by the foot activated push button 70 it is caused to be depressed and contact a terminal 98 within the first switch 74 causing the second terminal 60 of the second electric switch 44 to be connected to the positive terminal 66 of the electrical outlet 48. This activates the second electrical switch 44 to allow the passage of cold water therethrough for delivery to the faucet 20. A second contact 100 extends from the second switch 74. When the foot activated push button 70 is depressed further, the second contact 100 is caused to be depressed and contact a terminal 102 within the second switch 74 thereby connecting the second terminal 54 of the first electrical switch 42 to the positive terminal 66 of the electrical outlet 48. This activates the first electrical switch 42 to allow the passage of hot water therethrough for delivery to the faucet 20. When the first and second switches 72 and 74 are activated a mixture of the hot and cold water flows through the faucet 20. The temperature of the water being determined by the amount of pressure applied to the foot activated push button 70.

Figure 1:
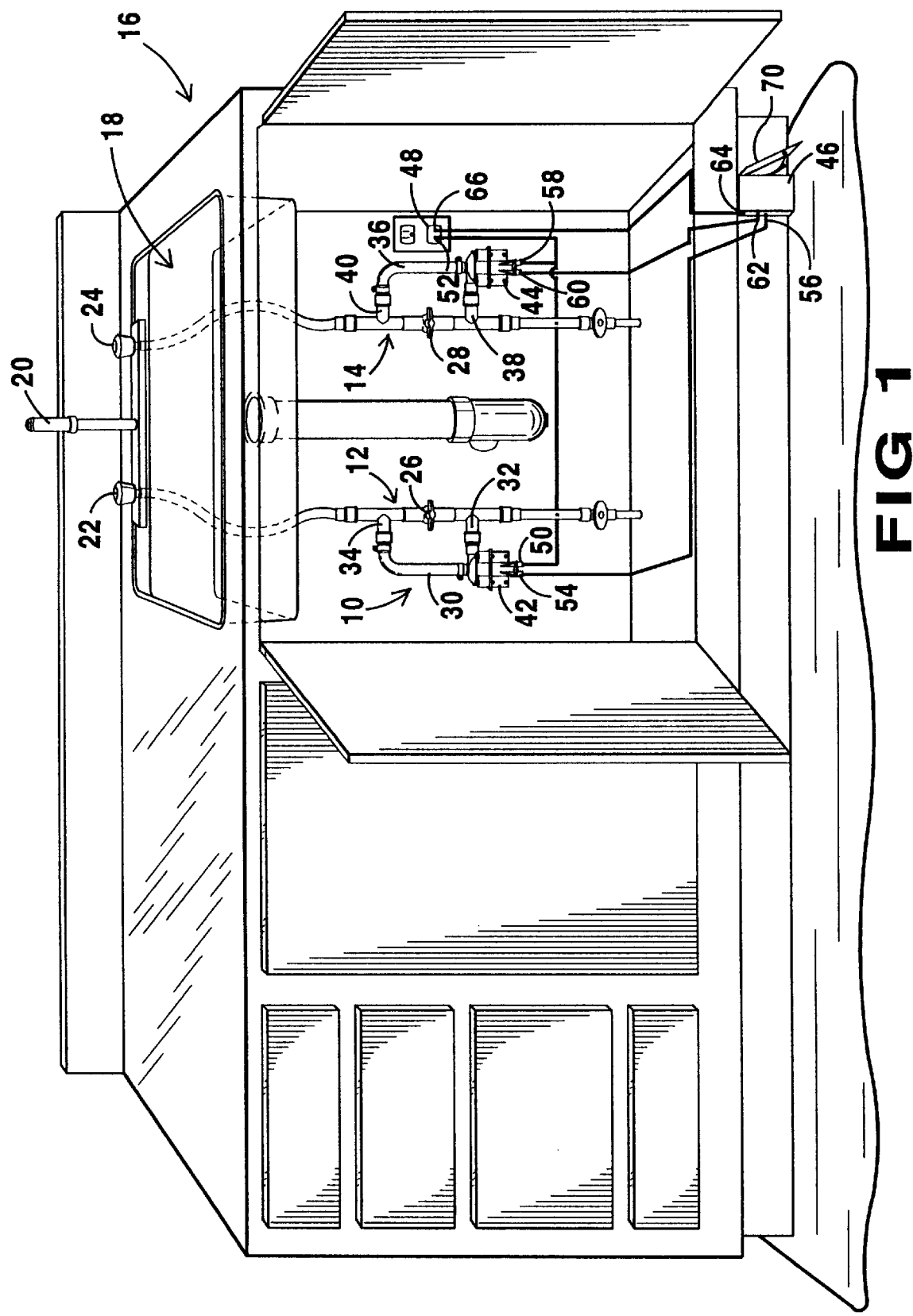
FIG. 1 is a front perspective view of the foot actuated flow control valve for a faucet of the present invention connected to bypass water flowing through water supply lines.

An exploded view of the base section 68 is illustrated in FIG. 4. From this view it is shown that the base section includes a first side 104 releasably connected to a second side 106. First and second securing devices 108 and 110 extend through the first and second switches 72 and 74 and the second side 106 securing the first and second switches 72 and 74 to the second side 106. The first and second sides 104 and 106 are releasably secured together by first and second securing devices 112 and 114. Extending from a top side 116 of the base section 68 is a device 118 for securing the base section 68 to the underside of the cabinet 16 as shown in FIG. 1. A hinge 120 is connected to the top side 116 of the base section 68 and hangs thereover. The foot activated push button 70 is secured to the hanging portion of the hinge 120 and thereby pivotally connected to the base section 68.

Figure 5:
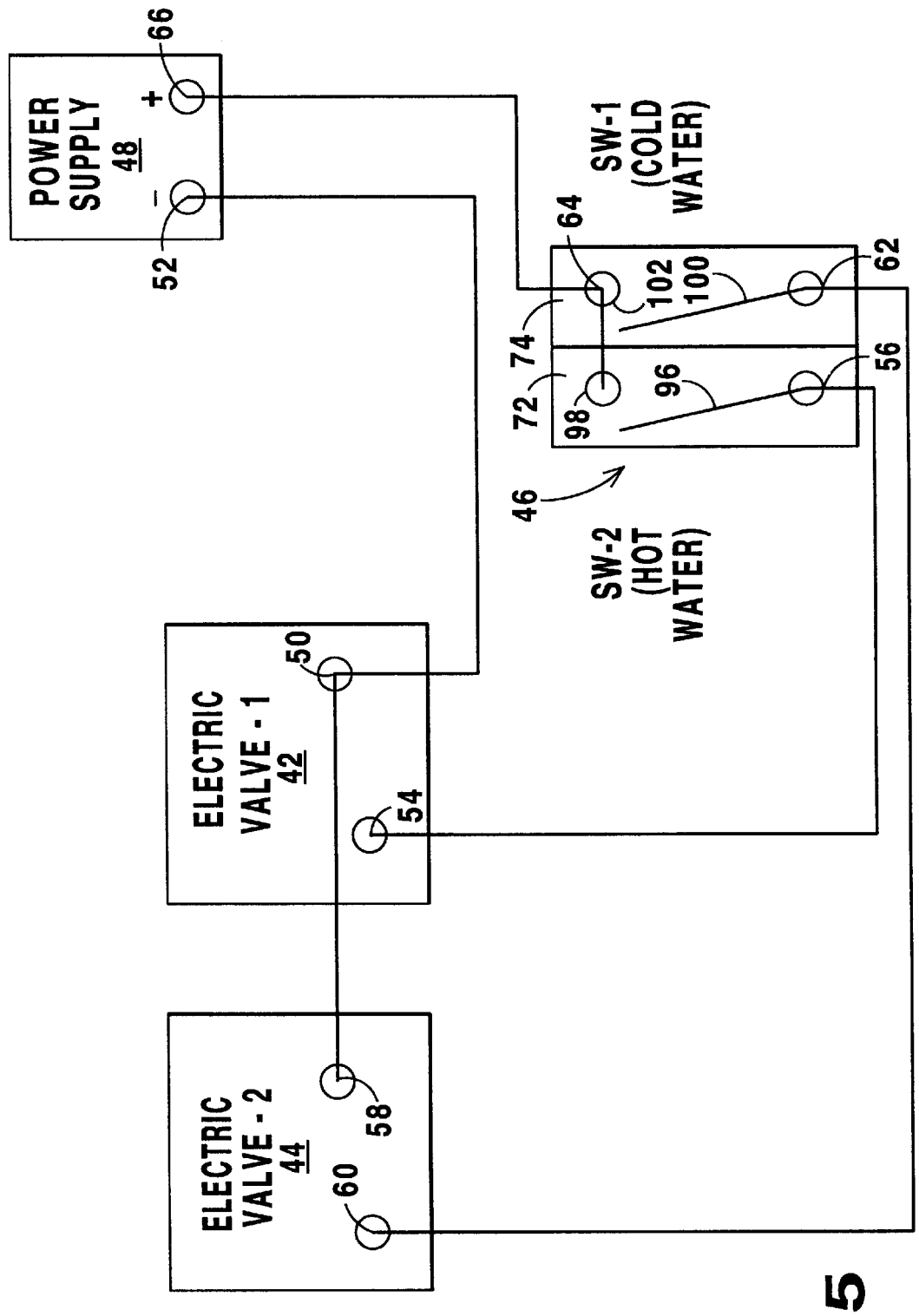
FIG. 5 is a block diagram illustrating the foot actuated flow control valve for a faucet of the present invention.

A block diagram of the electric components of the foot actuated flow control valve 10 is illustrated in FIG. 5. The first and second electric valves 42 and 44 are connected to the first and second bypass conduits 30 and 36, respectively, and control the flow of water therethrough. The negative or ground terminal 52 of the power supply 48 is connected to the first terminal 50 of the first electric switch 42 and to the first terminal 58 of the second electric switch 44. The positive voltage terminal 66 of the power supply 48 is connected to a third terminal 64 of the foot pedal 46. The third terminal 64 of the foot pedal 46 connects the positive voltage terminal 66 of the power supply 48 to the terminals 98 and 102 of the first and second switches 72 and 74. The first terminal 56 of the foot pedal 46 connects the contact 100 of the second switch 74 to the second terminal 54 of the first electric switch 42. The second terminal 62 of the foot pedal 46 connects the contact 96 of the first switch 72 to the second terminal 60 of the second electric switch 44. When the foot activated push button 70 is depressed, the contact 96 of the first switch 72 is caused to contact the terminal 98 of the first switch 72 thereby connecting the positive voltage terminal 66 of the power supply 48 to the second terminal 60 of the second electric switch 44 and opening the second electric switch 44 to allow cold water to pass therethrough. When the foot activated push button 70 is depressed further, the contact 100 of the second switch 74 is caused to contact the terminal 102 of the second switch 74 thereby connecting the positive voltage terminal 66 of the power supply 48 to the second terminal 54 of the first electric switch 42 and opening the first electric switch 42 to allow hot water to pass therethrough.

FIG. 8 illustrates the bypass conduit 30 or 36 including first and second shutoff valves 122 and 124 located on either side of the electric valve 42 or 44. The first and second shutoff valves 122 and 124 allow for the disengagement of the electric switches 42 and 44 of the foot actuated flow control valve 10 without turning off the supply line 12, 14. Thus, the faucet 20 is able to operate normally under the control of the control knobs 22, 24 and not under the control of the foot pedal 46. These valves 122, 124 are needed to remove the electric switches 42 and 44 during a power failure or failure of either or both electric switches 42, 44 to operate properly thereby allowing the faucet 20 to operate while the electric switches 42, 44 are removed or repaired. The electric switches 42, 44 may be placed in operation after repair or replacement by reconnecting them to the power supply as described above and turning the first and second shutoff valves 122 and 124 back to the open position.

Figure 6:
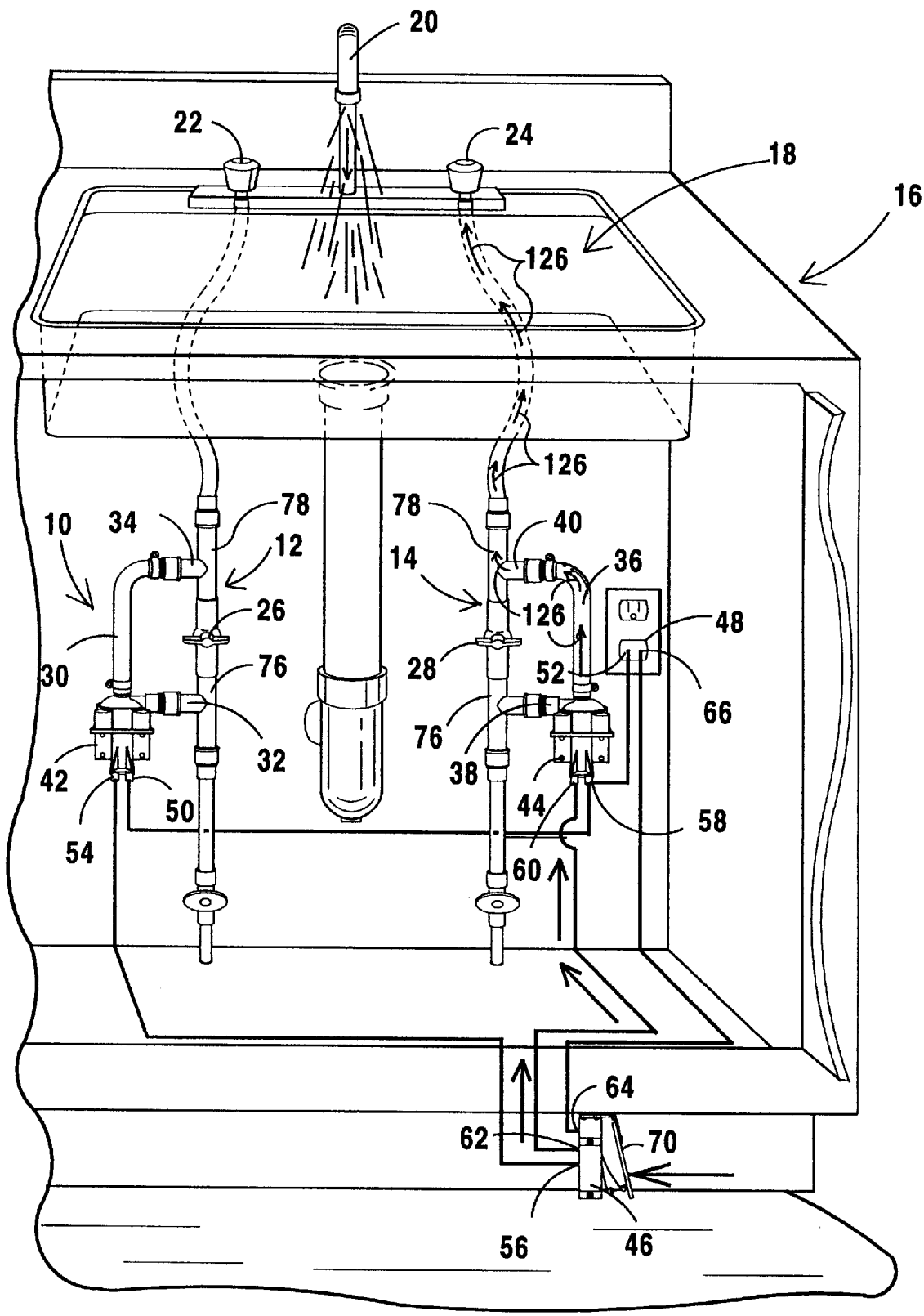
FIG. 6 is a front perspective view of a leg of the foot actuated flow control valve for a faucet of the present invention connected to bypass water flowing through water supply lines with the foot pedal actuated to supply water through one valve.

The operation of the foot actuated flow control valve for a faucet 10 will now be described with reference to the figures and specifically FIGS. 6 and 7. In operation, the first and second bypass conduits 30 and 36 of the foot actuated flow control valve 10 are connected to the hot and cold water supply lines 12 and 14, respectively. In order to connect the bypass conduits 30, 36, T-shaped pipes 76 and 78 must be connected to the hot and cold water lines 12 and 14 on either side of the main shut off valves 26 and 28. The input 32 and output 34 of the first bypass conduit 30 are connected to the T-shaped pipes on either side of the first shut off valve 26 and the input 38 and output 40 of the second bypass conduit 36 are connected to the T-shaped pipes on either side of the second shut off valve 28. The foot pedal 46 is then secured in a position beneath the sink 18 that is easily reached by the foot of a user. The foot pedal 46 may be secured to the cabinet 16 housing the sink 18.

The foot actuated flow control valve 10 must now be connected to a source of power. The first terminals 50, 58 of both the first and second electric switches 42 and 44 are connected to the negative or ground terminal 52 of the power source 48. The second terminal 54 of the first electric switch 42 is the connected to the first terminal 56 of the foot pedal 46. Next, the second terminal 60 of the second electric switch 44 is connected to the second terminal 62 of the foot pedal 46 and the third terminal 64 of the foot pedal 46 is connected to the positive voltage terminal 66 of the power source 48. The main shut off valves 26 and 28 are then turned to the off position thereby preventing water from flowing therethrough. The first and second electric switches 42 and 44 are in the normally closed position to prevent water from unintentionally flowing therethrough. The foot actuated flow control valve 10 is now ready for use.

In order for water to flow through the faucet 20 and into the sink 18, a user must depress the foot activated push button 70 at least partially. The depression of the foot activated push button 70 causes the contact 96 to contact the terminal 98 of the first switch 72. This will complete a circuit connecting the second electric switch 44 to the power supply 48 through the foot pedal 46 causing the second electric switch 44 to open. When the second electric switch 44 opens cold water is caused to flow through the second bypass conduit 36 as indicated by the arrows labeled 126. The cold water flowing through the second bypass conduit 36 then travels through the cold water supply line 14 and into the sink 18 for use by the user. When the foot activated push button 70 is depressed further, the second contact 100 is caused to contact the second terminal 102 of the second switch 74. This will complete a circuit connecting the first electric switch 42 to the power supply 48 through the foot pedal 46 causing the first electric switch 42 to open. When the first electric switch 42 opens hot water is caused to flow through the first bypass conduit 30 as indicated by the arrows labeled 128 in FIG. 7. The hot water flowing through the first bypass conduit 30 is caused to travel through the hot water supply line 12 and mix with the cold water flowing through the cold water supply line 14 to form a stream of warm water. The warm water travels through the faucet and into the sink 18 for use by the user.

The opening of the second electric switch 44 prior to the first electric switch 42 is for purposes of example only and not meant to limit the invention in any manner. In practice, the first electric switch 42 may be connected to open prior to or at the same time as the second electric switch 44 thereby providing hot water prior to cold water or always providing warm water to the faucet 20.

The pressure at which the water flows through the faucet is regulated and thus water will be controlled to exit the faucet at a predetermined pressure at all times.

From the above description it can be seen that the foot actuated flow control valve for a faucet of the present invention is able to overcome the shortcomings of prior art devices by providing a foot actuated flow control valve for a faucet which is able to control operation of the hot and/or cold water supply lines providing water to a faucet and automatically shut off the water supplied to a faucet upon removal of pressure from the foot pedal. The foot actuated flow control valve for a faucet includes a foot pedal for controlling a flow of water to the faucet which is easily activated by both children and persons with physical handicaps, is able to control the supply of both hot and cold water and eliminates the use of hand operated controls for controlling the supply of water exiting the faucet. The foot actuated flow control valve for a faucet also includes a manual cutoff valve for disconnecting the bypass conduit and allowing use of the manual faucet controls during a power failure. The foot actuated flow control valve for a faucet which is able to save at least 1000 gallons of water per month per user thereby decreasing the water bill of the user and providing the saved water for other uses such as in agriculture, eliminates the need for permits to store water on public lands due to the decreased amount of water needed to be stored and will eliminate the need for a plumber to replace the gasket in the faucet. Furthermore, the foot actuated flow control valve for a faucet of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A foot actuated flow control valve connected to a power supply for controlling the flow of a liquid substance through a water supply line to a faucet, said foot actuated flow control valve comprising:
    a) a first bypass conduit connected to the water supply line;
    b) a first electrically activated switch having a first terminal connected to a negative terminal of the power supply and a second terminal; and
    c) a foot pedal having a first terminal connected to a positive voltage terminal of the power supply, a second terminal connected to said second terminal of said first electrically activated switch and a first pivotal contact connected to said first terminal of said foot pedal, where in when a pressure is applied to said foot pedal said pivotal contact is caused to contact said second terminal of said foot pedal thereby connecting said first electrically activated switch to the power supply and opening said first electrically activated switch to allow water to pass through said first bypass conduit and said faucet, wherein
said first bypass conduit is connected to a cold water supply line, said valve further includes a second bypass conduit connected to a hot water supply line and a second electrically activated switch having a first terminal connected to the negative terminal of the power supply and a second terminal connected to the second terminal of the foot pedal, wherein application of a pressure to said foot pedal causes said second electrically activated switch to be connected to said power supply and said foot pedal further includes a third pivotal terminal connected to said second terminal of said second electrically activated switch and a second pivotal contact connected to said first terminal of said foot pedal, said second pivotal contact pivoting to connect said second electrically activated switch to the power source upon application of a pressure to said foot pedal.

2. The foot actuated flow control valve as recited in claim 1, wherein said first pivotal contact is caused to pivot towards said second terminal of said foot pedal and connect said first electrically activated switch to the power source upon application of a first predefined amount of pressure to said foot pedal and said second pivotal contact is caused to pivot towards said third terminal of said foot pedal and connect said second electrically activated switch to the power source upon application of a second predefined amount of pressure to said foot pedal.

3. The foot actuated flow control valve as recited in claim 2, wherein said first predetermined amount of pressure is smaller than said second predetermined amount of pressure.

4. The foot actuated flow control valve as recited in claim 2, wherein said second predetermined amount of pressure is smaller than said first predetermined amount of pressure.

5. The foot actuated flow control valve as recited in claim 3, wherein application of said second predetermined amount of pressure to said foot pedal causes cold water to flow through said first bypass conduit and hot water to flow through said second bypass conduit, said hot and cold water mixing to provide warm water to said faucet.

6. The foot actuated flow control valve as recited in claim 1, wherein application of said first predetermined amount of pressure to said foot pedal causes cold water to flow through said first bypass conduit and hot water to flow through said second bypass conduit, said hot and cold water mixing to provide warm water to said faucet.

7. The foot actuated flow control valve as recited in claim 1, further comprising first and second shut off valves connected to said first bypass conduit on either side of said first electrically activated switch.

8. The foot actuated flow control valve as recited in claim 1, further comprising first and second shut off valves connected to said first bypass conduit on either side of said first electrically activated switch and third and fourth shut off valves connected to said second bypass conduit on either side of said second electrically activated switch, said first and second shut off valves preventing a flow of water through said first bypass conduit when in a closed position and said third and fourth shut off valves preventing a flow of water through said second bypass conduit when in a closed position.

9. The foot actuated flow control valve as recited in claim 1, wherein said foot pedal includes a foot activated push button for pivoting said first pivotal contact upon application of a pressure thereto.

10. The foot actuated flow control valve as recited in claim 9, wherein said foot activated push button is pivotally connected to said foot pedal.

11. A foot actuated flow control valve connected to a power supply for controlling the flow of a liquid substance through a water supply line to a faucet, said foot actuated flow control valve comprising:

a) a first bypass conduit connected to the water supply line;

b) a first electrically activated switch having a first terminal connected to a negative terminal of the power supply and a second terminal; and c) a foot pedal having a first terminal connected to a positive voltage terminal of the power supply, a second terminal connected to said second terminal of said first electrically activated switch and a first pivotal contact connected to said first terminal of said foot pedal, wherein when a pressure is applied to said foot pedal said pivotal contact is caused to contact said second terminal of said foot pedal thereby connecting said first electrically activated switch to the power supply and opening said first electrically activated switch to allow water to pass through said first bypass conduit and said faucet, wherein said first bypass conduit is connected to a cold water supply line and said valve further includes a second bypass conduit connected to a hot water supply line and a second electrically activated switch having a first terminal connected to the negative terminal of the power supply and a second terminal connected to the second terminal of the foot pedal, wherein application of a pressure to said foot pedal causes said second electrically activated switch to be connected to said power supply and said foot pedal includes a first foot activated push button for pivoting said first pivotal contact upon application of a first predetermined amount of pressure thereto and a second foot activated push button for pivoting said second pivotal contact upon application of a second predetermined amount of pressure thereto.

12. The foot actuated flow control valve as recited in claim 11, wherein said foot activated push button is pivotally connected to said foot pedal.

13. The foot actuated flow control valve as recited in claim 1, wherein said water supply line includes a shut off valve connected thereto and further including first and second T-shaped pipes connected to the water supply line on either side of said shut off valve, said first bypass conduit being connected to said first and second T-shaped pipes causing water flowing through said water supply line to bypass the shut off valve.

14. The foot actuated flow control valve as recited in claim 1, wherein said cold water supply line includes a first shut off valve connected thereto and further including first and second T-shaped pipes connected to the cold water supply line on either side of said first shut off valve, said first bypass conduit being connected to said first and second T-shaped pipes causing water flowing through said cold water supply line to bypass the first shut off valve and said hot water supply line includes a second shut off valve connected thereto and further including third and fourth T-shaped pipes connected to the hot water supply line on either side of said second shut off valve, said second bypass conduit being connected to said third and fourth T-shaped pipes causing water flowing through said hot water supply line to bypass the second shut off valve.

* * * * *